United States Patent
Han et al.

(10) Patent No.: US 12,535,209 B1
(45) Date of Patent: Jan. 27, 2026

(54) COAL CONVEYING CONTROL SYSTEM AND METHOD FOR THERMAL POWER PLANT

(71) Applicant: HUANENG CHAOHU POWER GENERATION CO., LTD., Chaohu (CN)

(72) Inventors: Baogeng Han, Hefei (CN); Yiru Wang, Hefei (CN); Jiajia Ma, Hefei (CN); Yuanshuang Geng, Hefei (CN); Xuemin Zhang, Hefei (CN); Yu Bai, Hefei (CN); Changqing Wang, Hefei (CN); Dexian Liu, Hefei (CN); Zhixu Zhao, Hefei (CN)

(73) Assignee: HUANENG CHAOHU POWER GENERATION CO., LTD., Anhui (CN)

( * ) Notice: Subject to any disclaimer, the term of this patent is extended or adjusted under 35 U.S.C. 154(b) by 0 days.

(21) Appl. No.: 19/199,528

(22) Filed: May 6, 2025

(30) Foreign Application Priority Data

Jul. 23, 2024 (CN) .......................... 202410993324.3

(51) Int. Cl.
*F22B 35/00* (2006.01)
*F22B 35/18* (2006.01)
(Continued)

(52) U.S. Cl.
CPC ............... *F22B 35/18* (2013.01); *F23K 1/00* (2013.01); *F23K 3/00* (2013.01); *F23N 1/002* (2013.01);
(Continued)

(58) Field of Classification Search
CPC ... F22B 35/18; F23K 1/00; F23K 3/00; F23K 2201/101; F23K 2203/002; F23N 1/002; F23N 2221/02; F23N 2239/02
See application file for complete search history.

(56) References Cited

U.S. PATENT DOCUMENTS 7,410,356 B2 * 8/2008 Higgins .................. F23C 10/10
432/17
2004/0227024 A1 * 11/2004 Biswas ................. B02C 15/001
241/119

(Continued)

FOREIGN PATENT DOCUMENTS

| CN | 103759290 A | 4/2014 |
| CN | 106225009 A | 12/2016 |

(Continued)

*Primary Examiner* — Shogo Sasaki

(74) *Attorney, Agent, or Firm* — Ming Jiang; OPENPTO US LLC

(57) ABSTRACT

The disclosure provides a coal conveying control system and method for a thermal power plant. The system includes: a model prediction module, used for building an operating load prediction model, and obtaining a boiler operating load optimal value; a load calculation module, used for drawing an operating load difference value curve, and determining a boiler coal consumption change amount; a speed control module, used for determining a coal conveying amount of a coal conveying system, and controlling operating speed of a coal conveying belt according to the coal conveying amount; a quality calculation module, used for calculating boiler operating efficiency, and determining a coal quality parameter according to the boiler operating efficiency; a fineness control module, used for determining a coal particle parameter, setting target coal particle fineness according to the coal particle parameter, and controlling a screening and crushing device according to the target coal particle fineness.

6 Claims, 2 Drawing Sheets

(51) Int. Cl.
*F23K 1/00* (2006.01)
*F23K 3/00* (2006.01)
*F23N 1/00* (2006.01)

(52) U.S. Cl.
CPC .. *F23K 2201/101* (2013.01); *F23K 2203/002* (2013.01); *F23N 2221/02* (2020.01); *F23N 2239/02* (2020.01)

(56) References Cited

U.S. PATENT DOCUMENTS

2009/0007827 A1* 1/2009 Sarv .................. F23C 5/32
　　　　　　　　　　　　　　　　　　　431/9
2016/0298040 A1* 10/2016 Chen .................. C10J 3/02
2021/0025585 A1* 1/2021 Axelbaum ............... F22B 1/22

FOREIGN PATENT DOCUMENTS

| | | |
|---|---|---|
| CN | 112651568 A | 4/2021 |
| CN | 115685898 A | 2/2023 |
| CN | 116066852 A | 5/2023 |
| CN | 118333228 A | 7/2024 |
| JP | 2000171028 A | 6/2000 |

\* cited by examiner

COAL CONVEYING CONTROL SYSTEM AND METHOD FOR THERMAL POWER PLANT

CROSS-REFERENCE TO RELATED APPLICATIONS

This application claims priority of Chinese Patent Application No. 202410993324.3, filed on Jul. 23, 2024, the contents of which are hereby incorporated by reference.

TECHNICAL FIELD

The disclosure relates to the technical field of electrical control, and more specifically relates to a coal conveying control system and method for a thermal power plant.

BACKGROUND

With the development of electric power industry and people's increasing demand for electricity, large-capacity and large-unit thermal power plants have gradually occupied a dominant position in our country. Fuel transportation, stacking and unloading and other links are the basic conditions to ensure the normal operation of the unit to generate electricity. Coal conveying system is one of the main auxiliary systems of thermal power plant, which has many types of equipment and unique operation and control methods. In recent years, with the remarkable improvement of automation level of coal conveying system and the application of PLC programmable control, its technical content has obviously increased. Therefore, attaching importance to the work of coal conveying system and deepening the comprehensive management of coal conveying system are important guarantees for the safe, civilized, economic and scientific management of thermal power plants.

In the actual production of thermal power plants, a constant-speed belt conveyor and a screening and crushing device with fixed coal particle fineness are usually used to convey coal for boilers, so as to ensure the reliability of users' electricity consumption. Therefore, the phenomenon of low load rate of coal conveying belts and low operation efficiency of boilers usually occurs. How to achieve the most efficient and energy-saving effect of boilers through dynamic analysis and control of coal conveying systems has become a technical problem to be solved urgently in this field.

SUMMARY

The disclosure provides a coal conveying control system and method for a thermal power plant, which are used for solving the technical problems of high energy consumption and low efficiency of the coal conveying system in the prior art, the system includes:

a model prediction module, used for obtaining current boiler working parameters, building an operating load prediction model, and obtaining a boiler operating load optimal value according to the operating load prediction model;

a load calculation module, used for obtaining a boiler operating load measured value, drawing an operating load difference value curve according to the boiler operating load measured value, and determining a boiler coal consumption change amount according to the operating load difference value curve;

a speed control module, used for determining a coal conveying amount of a coal conveying system according to the boiler coal consumption change amount, and controlling operating speed of a coal conveying belt according to the coal conveying amount;

a quality calculation module, used for calculating boiler operating efficiency according to the operating speed, and determining a coal quality parameter according to the boiler operating efficiency;

a fineness control module, used for determining a coal particle parameter according to the coal quality parameter, setting target coal particle fineness according to the coal particle parameter, and controlling a screening and crushing device according to the target coal particle fineness.

Further, the model prediction module is used for:

obtaining historical boiler working parameters and corresponding historical operating load data, and preprocessing the historical boiler working parameters and corresponding historical operating load data;

building a data set according to preprocessed historical boiler working parameters and corresponding historical operating load data, and building the operating load prediction model according to the data set;

training the operating load prediction model according to the data set, obtaining a final operating load prediction model;

inputting the current boiler working parameters into the final operating load prediction model, obtaining the boiler operating load optimal value.

Further, the load calculation module is used for:

calculating a difference value between the boiler operating load measured value and the optimal value, and drawing the operating load difference value curve according to a change trend of the difference value between the boiler operating load measured value and the optimal value with time;

determining an average value of the operating load difference value in a preset time period according to the operating load difference value curve, and if the average value of the operating load difference value in the preset time period is less than a first preset threshold value, setting the boiler coal consumption change amount to zero;

if the average value of the operating load difference value in the preset time period is greater than or equal to the first preset threshold value, setting a boiler coal consumption change amount standard value, calculating a ratio of the average value of the operating load difference value in the preset time period to a preset standard average value, obtaining a boiler coal consumption change amount correction value;

multiplying the boiler coal consumption change amount correction value with the boiler coal consumption change amount standard value, obtaining the boiler coal consumption change amount in the preset time period.

Further, the speed control module is used for:

determining a boiler coal consumption amount in the preset time period according to the boiler coal consumption change amount, and determining a target coal conveying amount of the coal conveying belt in the preset time period according to the boiler coal consumption amount in the preset time period;

dividing the preset time period into a plurality of sub-periods, and setting a maximum allowable cross-sectional area of the coal conveying belt in each of the sub-periods according to the target coal conveying amount in the preset time period;

obtaining a current cross-sectional area of the coal conveying belt, calculating a ratio of the current cross-sectional area to the maximum allowable cross-sectional area, and obtaining full load rate of the coal conveying belt;

controlling the conveying speed of the coal conveying belt according to the full load rate of the coal conveying belt.

Further, the speed control module is further used for:

detecting the full load rate of the coal conveying belt in real time, and drawing a full load rate change curve according to a change trend of the full load rate of the coal conveying belt with time;

when current full load rate being less than a first preset threshold is detected, calculating an absolute value of a slope average value of the current full load rate in a each of the sub-periods according to the full load rate change curve, and obtaining a full load rate change speed parameter;

calculating a ratio of a preset standard full load rate change speed parameter to the full load rate change speed parameter, obtaining a conveying speed correction parameter;

multiplying the conveying speed correction parameter with current coal conveying belt conveying speed, obtaining corrected coal conveying belt conveying speed, and updating the corrected coal conveying belt conveying speed to the current coal conveying belt conveying speed.

Further, the quality calculation module is used for:

determining an actual coal conveying amount in the preset time period according to conveying speed of the coal conveying belt in the preset time period, and calculating a boiler operating efficiency optimal value corresponding to the actual coal conveying amount according to boiler coal type information;

obtaining a boiler operating efficiency measured value in the preset time period, calculating a difference value between the boiler operating efficiency optimal value and the measured value, and obtaining an operating efficiency difference value;

calculating a ratio between the operating efficiency difference value and a preset standard operating efficiency difference value, and normalizing the ratio between the operating efficiency difference value and the preset standard operating efficiency difference value, obtaining the coal quality parameter.

Further, the fineness control module is used for:

substituting the coal quality parameter into a coal particle parameter calculation formula, obtaining the coal particle parameter, where the coal particle parameter calculation formula specifically is:

$$R_s = R_\alpha \exp(Q_s)$$

where $R_s$ is the coal particle parameter, $R_\alpha$ is a preset standard coal particle parameter, exp is a natural exponential function, and $Q_s$ is a coal quality parameter.

Further, the fineness control module is further used for:

determining a coal particle fineness correction value according to a difference value between the coal particle parameter and the preset standard coal particle parameter, and if the difference value between the coal particle parameter and the preset standard coal particle parameter is greater than a second preset threshold, setting a first correction value as the coal particle fineness correction value;

if the difference value between the coal particle parameter and the preset standard coal particle parameter is less than or equal to the second preset threshold, setting a second correction value as the coal particle fineness correction value;

if the difference value between the coal particle parameter and the preset standard coal particle parameter is less than a third preset threshold, setting a third correction value as the coal particle fineness correction value.

Further, the fineness control module is further used for:

obtaining coal particle fineness of a current screening and crushing device, and multiplying the coal particle fineness of the current screening and crushing device with the coal particle fineness correction value, obtaining the target coal particle fineness;

inputting the target coal particle fineness into the screening and crushing device, and performing screening and crushing on coal by the screening and crushing device.

In order to achieve the above object, the disclosure also provides a coal conveying control method for a thermal power plant, which includes:

obtaining current boiler working parameters, building an operating load prediction model, and obtaining a boiler operating load optimal value according to the operating load prediction model;

obtaining a boiler operating load measured value, drawing an operating load difference value curve according to the boiler operating load measured value, and determining a boiler coal consumption change amount according to the operating load difference value curve;

determining a coal conveying amount of a coal conveying system according to the boiler coal consumption change amount, and controlling operating speed of a coal conveying belt according to the coal conveying amount;

calculating boiler operating efficiency according to the operating speed, and determining a coal quality parameter according to the boiler operating efficiency;

determining a coal particle parameter according to the coal quality parameter, setting target coal particle fineness according to the coal particle parameter, and controlling a screening and crushing device according to the target coal particle fineness.

The disclosure has the following beneficial effects.

By applying the technical scheme, the coal conveying amount of the coal conveying system is calculated by the boiler load, so that the dynamic control of the operating speed of the coal conveying belt is realized, so that the coal conveying belt runs at the highest full load rate at all times, and the optimal matching of the conveying amount and the speed is realized. And meanwhile, the coal particle fineness is adjusted in time by detecting the boiler operating efficiency corresponding to the coal conveying amount in real time, so that the coal conveying system is more energy-saving and the operating efficiency of units in thermal power plants is improved.

BRIEF DESCRIPTION OF THE DRAWINGS

In order to explain the technical scheme in the embodiment of the disclosure more clearly, the drawings needed in the description of the embodiment will be briefly introduced below. Obviously, the drawings in the following description are only some embodiments of the disclosure. For those

DETAILED DESCRIPTION OF THE EMBODIMENTS

In the following, the technical scheme in the embodiment of this disclosure will be described clearly and completely in combination with the attached drawings in the embodiment of this disclosure. Obviously, the described embodiment is only a part of the embodiment of this disclosure, but not all of the embodiments. Based on the embodiments in this disclosure, all other embodiments obtained by ordinary skilled in this field without creative efforts belong to the protection scope of this disclosure.

Figure 1:
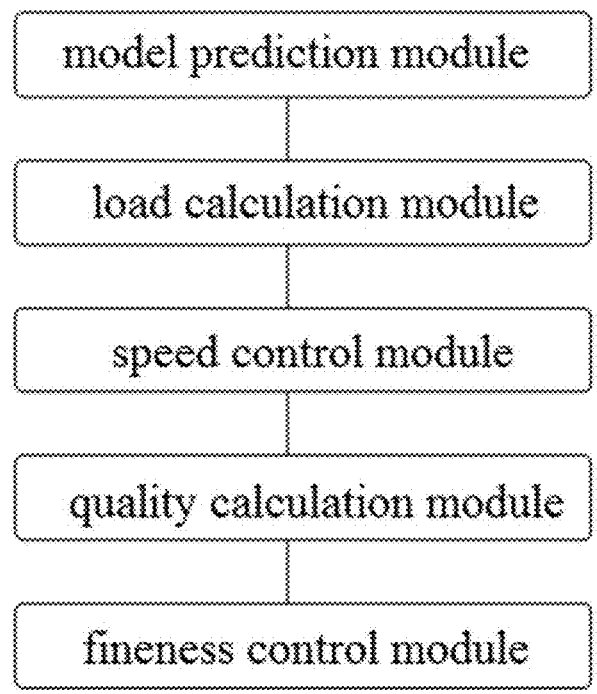
FIG. 1 shows a schematic structural diagram of a coal conveying control system for a thermal power plant according to an embodiment of the disclosure.

The embodiments of the disclosure provide a coal conveying control system for a thermal power plant, as shown in FIG. 1, including:

a model prediction module, used for obtaining current boiler working parameters, building an operating load prediction model, and obtaining a boiler operating load optimal value according to the operating load prediction model; a load calculation module, used for obtaining a boiler operating load measured value, drawing an operating load difference value curve according to the boiler operating load measured value, and determining a boiler coal consumption change amount according to the operating load difference value curve; a speed control module, used for determining a coal conveying amount of a coal conveying system according to the boiler coal consumption change amount, and controlling operating speed of a coal conveying belt according to the coal conveying amount; a quality calculation module, used for calculating boiler operating efficiency according to the operating speed, and determining a coal quality parameter according to the boiler operating efficiency; a fineness control module, used for determining a coal particle parameter according to the coal quality parameter, setting target coal particle fineness according to the coal particle parameter, and controlling a screening and crushing device according to the target coal particle fineness.

In this embodiment, the coal conveying system conveys the coal to the screening and crushing device through the conveying belt, and the coal particles are screened and crushed to the target coal particle fineness through the screening and crushing device and then conveyed to the boiler for combustion. In this embodiment, the sensors are arranged in the boiler, which can detect the temperature, pressure and flow of the furnace in real time, and obtain the boiler operating load measured value through the load calculation module.

In some embodiments of the disclosure, the model prediction module is used for: obtaining historical boiler working parameters and corresponding historical operating load data, and preprocessing the historical boiler working parameters and corresponding historical operating load data; building a data set according to preprocessed historical boiler working parameters and corresponding historical operating load data, and building the operating load prediction model according to the data set; training the operating load prediction model according to the data set, obtaining a final operating load prediction model; inputting the current boiler working parameters into the final operating load prediction model, obtaining the boiler operating load optimal value.

In this embodiment, the boiler working parameters are the parameters that affect the load during the operation of the boiler, including bed temperature, bed pressure, oxygen content, primary and secondary air distribution ratios, etc. Preprocessing methods such as denoising and redundancy removal are used to preprocess the historical boiler working parameters and the corresponding historical operating load data, so as to obtain a data set. Based on one or more of convolution neural network, deep neural network and genetic algorithm, a boiler operating efficiency prediction model is constructed.

In some embodiments of the disclosure, the load calculation module is used for: calculating a difference value between the boiler operating load measured value and the optimal value, and drawing the operating load difference value curve according to a change trend of the difference value between the boiler operating load measured value and the optimal value with time; determining an average value of the operating load difference value in a preset time period according to the operating load difference value curve, and if the average value of the operating load difference value in the preset time period is less than a first preset threshold value, setting the boiler coal consumption change amount to zero; if the average value of the operating load difference value in the preset time period is greater than or equal to the first preset threshold value, setting a boiler coal consumption change amount standard value, calculating a ratio of the average value of the operating load difference value in the preset time period to a preset standard average value, obtaining a boiler coal consumption change amount correction value; multiplying the boiler coal consumption change amount correction value with the boiler coal consumption change amount standard value, obtaining the boiler coal consumption change amount in the preset time period.

In this embodiment, the boiler coal consumption change amount correction value is determined by the ratio between the average value of operating load difference value and the preset standard average value in a preset time period. The farther the ratio is from 1, the more the boiler operating load measured value deviates from the standard value. Therefore, the boiler coal consumption change amount standard value should be corrected according to the deviation degree of the ratio to realize the dynamic adjustment of boiler coal consumption amount.

In some embodiments of the disclosure, the speed control module is used for: determining a boiler coal consumption amount in the preset time period according to the boiler coal consumption change amount, and determining a target coal conveying amount of the coal conveying belt in the preset time period according to the boiler coal consumption amount in the preset time period; dividing the preset time period into a plurality of sub-periods, and setting a maximum allowable cross-sectional area of the coal conveying belt in each of the sub-periods according to the target coal conveying amount in the preset time period; obtaining a current cross-sectional area of the coal conveying belt, calculating a ratio of the current cross-sectional area to the maximum allowable cross-sectional area, and obtaining full load rate of the coal conveying belt; controlling the conveying speed of the coal conveying belt according to the full load rate of the coal conveying belt.

In this embodiment, the initial boiler coal consumption amount in the preset time period is added with the coal consumption change amount to obtain the current optimal boiler coal consumption amount. In this embodiment, the coal conveying amount is determined by obtaining the cross-sectional area of coal on the coal conveying belt, the preset time period is divided into several sub-periods on average, and the coal conveying amount in the preset time period reaches the target coal conveying amount by controlling the maximum allowable cross-sectional area in the sub-periods.

In some embodiments of the disclosure, the speed control module is further used for: detecting the full load rate of the coal conveying belt in real time, and drawing a full load rate change curve according to a change trend of the full load rate of the coal conveying belt with time; when current full load rate being less than a first preset threshold is detected, calculating an absolute value of a slope average value of the current full load rate in a each of the sub-periods according to the full load rate change curve, and obtaining a full load rate change speed parameter; calculating a ratio of a preset standard full load rate change speed parameter to the full load rate change speed parameter, obtaining a conveying speed correction parameter; multiplying the conveying speed correction parameter with current coal conveying belt conveying speed, obtaining corrected coal conveying belt conveying speed, and updating the corrected coal conveying belt conveying speed to the current coal conveying belt conveying speed.

In this embodiment, the conveying speed is controlled by the full load rate of the coal conveying belt. When the full load rate is too low, the descending speed of the full load rate is obtained by calculating the absolute value of the slope average value of the full load rate in this sub-period. The faster the descending speed, the slower the corresponding conveying speed should be, so that the full load rate of the coal conveying belt is always maintained at the optimal value, and the optimal matching between the conveying amount and the speed is realized.

In some embodiments of the disclosure, the quality calculation module is used for: determining an actual coal conveying amount in the preset time period according to conveying speed of the coal conveying belt in the preset time period, and calculating a boiler operating efficiency optimal value corresponding to the actual coal conveying amount according to boiler coal type information; obtaining a boiler operating efficiency measured value in the preset time period, calculating a difference value between the boiler operating efficiency optimal value and the measured value, and obtaining an operating efficiency difference value; calculating a ratio between the operating efficiency difference value and a preset standard operating efficiency difference value, and normalizing the ratio between the operating efficiency difference value and the preset standard operating efficiency difference value, obtaining the coal quality parameter.

In this embodiment, the optimal boiler operation efficiency of the current coal type is calculated by the actual coal conveying amount, and the coal quality parameter is obtained by the ratio of the operating efficiency difference value to the preset standard operating efficiency difference value.

In this embodiment, the normalization processing formula is specifically:

$$P_i = \frac{P - P_{avg}}{P_{max} - P_{min}};$$

where $P_i$ is the ratio of normalized operating efficiency difference value to preset standard operating efficiency difference value, P is the ratio of current operating efficiency difference value to preset standard operating efficiency difference value, $P_{avg}$ is the average value of the ratio of historical operating efficiency difference value to preset standard operating efficiency difference value, $P_{max}$ is the maximum value of the ratio of historical operating efficiency difference value to preset standard operating efficiency difference value, and $P_{min}$ is the minimum value of the ratio of historical operating efficiency difference value to preset standard operating efficiency difference value.

In this embodiment, the ratio of the operating efficiency difference value to the preset standard operating efficiency difference value is limited to [−1, 1] through normalization, so as to obtain the coal quality parameter, and the larger the parameter, the better the coal quality.

In some embodiments of the disclosure, the fineness control module is used for: substituting the coal quality parameter into a coal particle parameter calculation formula, obtaining the coal particle parameter, where the coal particle parameter calculation formula specifically is:

$$R_s = R_\alpha \exp(Q_s)$$

where $R_s$ is the coal particle parameter, $R_\alpha$ is a preset standard coal particle parameter, exp is a natural exponential function, and $Q_s$ is a coal quality parameter.

In some embodiments of the disclosure, the fineness control module is further used for: determining a coal particle fineness correction value according to a difference value between the coal particle parameter and the preset standard coal particle parameter, and if the difference value between the coal particle parameter and the preset standard coal particle parameter is greater than a second preset threshold, setting a first correction value as the coal particle fineness correction value; if the difference value between the coal particle parameter and the preset standard coal particle parameter is less than or equal to the second preset threshold, setting a second correction value as the coal particle fineness correction value; if the difference value between the coal particle parameter and the preset standard coal particle parameter is less than a third preset threshold, setting a third correction value as the coal particle fineness correction value.

In this embodiment, after the coal particle parameter is calculated by the coal quality parameter, the coal particle fineness correction value is determined by the difference value between the coal particle parameter and the preset standard coal particle parameter, which is usually negative, so the smaller the difference value, the lower the quality of coal type, the higher the boiler operating efficiency needs to be improved, and the boiler operating efficiency can be well improved by reducing the coal particle fineness, so the first correction value, the second correction value and the third correction value are set in order from large to small. And the range of the first correction value, the second correction value and the third correction value is [0, 1], and the second preset threshold value is greater than the third preset threshold value. When the difference value between the coal particle parameter and the preset standard coal particle parameter is lower, the coal particle fineness correction value is smaller, that is, the correction degree of the coal particle fineness is higher.

In some embodiments of the disclosure, the fineness control module is further used for: obtaining coal particle fineness of a current screening and crushing device, and multiplying the coal particle fineness of the current screening and crushing device with the coal particle fineness correction value, obtaining the target coal particle fineness; inputting the target coal particle fineness into the screening and crushing device, and performing screening and crushing on coal by the screening and crushing device.

In this embodiment, the coal particle fineness of the coal can be dynamically adjusted by setting the screening and crushing device, thus improving the operation efficiency.

Figure 2:
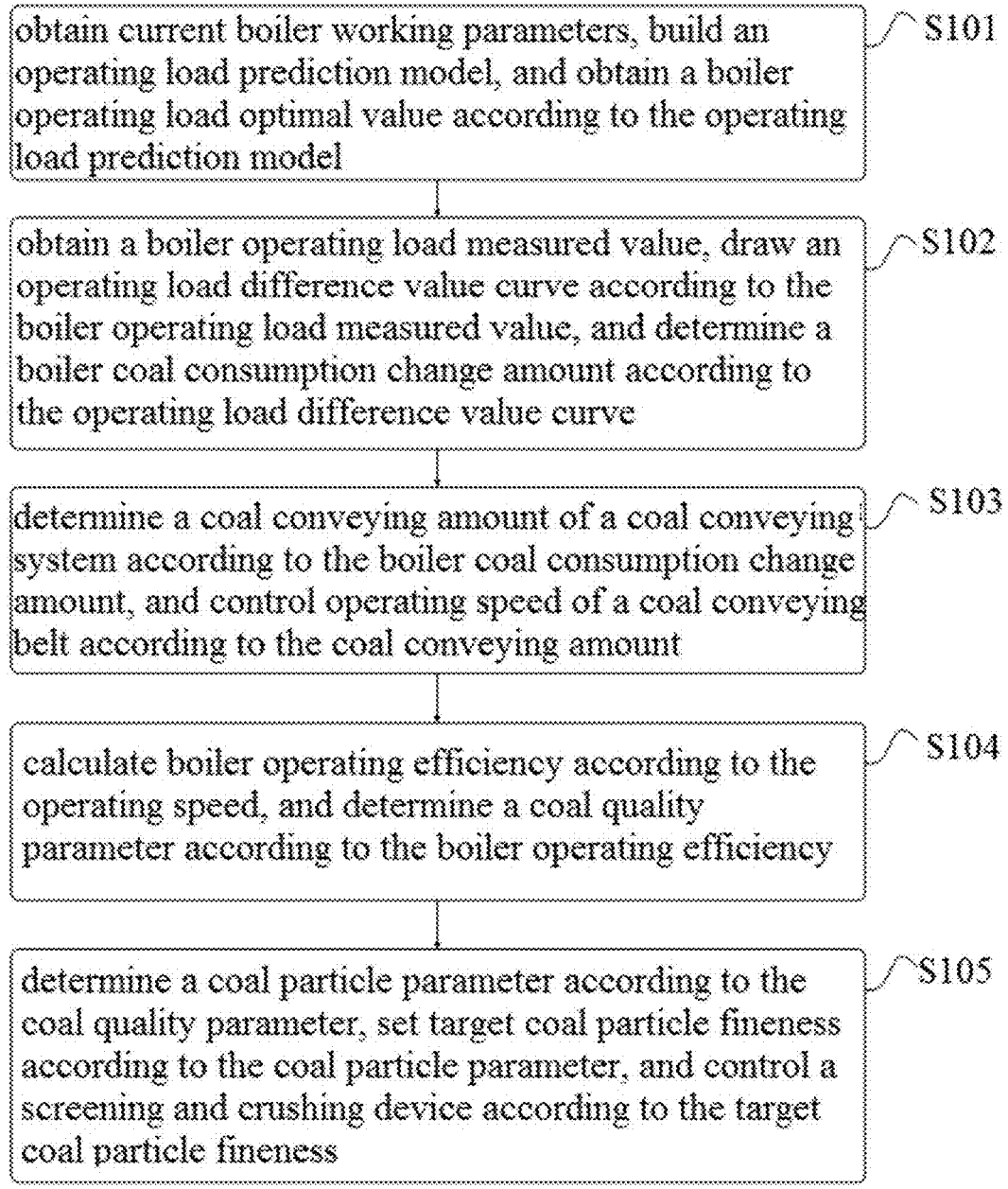
FIG. 2 shows an overall flow chart of a coal conveying control method for a thermal power plant according to an embodiment of the disclosure.

Based on the same technical concept, as shown in FIG. 2, the disclosure also provides a coal conveying control method for a thermal power plant, including:

S101, current boiler working parameters are obtained, an operating load prediction model is built, and a boiler operating load optimal value is obtained according to the operating load prediction model;

S102, a boiler operating load measured value is obtained, an operating load difference value curve is drawn according to the boiler operating load measured value, and a boiler coal consumption change amount is determined according to the operating load difference value curve;

S103, a coal conveying amount of a coal conveying system is determined according to the boiler coal consumption change amount, and operating speed of a coal conveying belt is controlled according to the coal conveying amount;

S104, boiler operating efficiency is calculated according to the operating speed, and a coal quality parameter is determined according to the boiler operating efficiency;

S105, a coal particle parameter is determined according to the coal quality parameter, target coal particle fineness is set according to the coal particle parameter, and a screening and crushing device is controlled according to the target coal particle fineness.

By applying the above technical scheme, in the disclosure, current boiler working parameters are obtained, an operating load prediction model is built, and a boiler operating load optimal value is obtained according to the operating load prediction model; a boiler operating load measured value is obtained, an operating load difference value curve is drawn according to the boiler operating load measured value, and a boiler coal consumption change amount is determined according to the operating load difference value curve; a coal conveying amount of a coal conveying system is determined according to the boiler coal consumption change amount, and operating speed of a coal conveying belt is controlled according to the coal conveying amount; boiler operating efficiency is calculated according to the operating speed, and a coal quality parameter is determined according to the boiler operating efficiency; a coal particle parameter is determined according to the coal quality parameter, target coal particle fineness is set according to the coal particle parameter, and a screening and crushing device is controlled according to the target coal particle fineness. So that the coal conveying system is more energy-saving and the operating efficiency of thermal power plant units is improved.

From the description of the above embodiments, those skilled in the art can clearly understand that the disclosure can be realized by hardware, or by means of software and necessary general hardware platform. Based on this understanding, the technical scheme of the disclosure can be embodied in the form of a software product, which can be stored in a non-volatile storage medium (such as CD-ROM, USB flash drive, mobile hard disk, etc.) and several instructions are included to make a computer device (such as a personal computer, a server, or a network device, etc.) perform the methods described in various embodiments of the disclosure.

Finally, it should be explained that the above embodiments are only used to illustrate the technical scheme of the disclosure, but not to limit it. Although the disclosure has been described in detail with reference to the foregoing embodiments, it should be understood by those skilled in the art that the technical solutions described in the foregoing embodiments can still be amended or some technical features thereof can be replaced by equivalents. However, these amendments or substitutions do not drive the essence of the corresponding technical solutions away from the spirit and scope of the technical solutions of various embodiments of the disclosure.

What is claimed is:

1. A coal conveying control system for a thermal power plant, comprising:
   a model prediction module, configured to obtain current boiler working parameters by sensors arranged in a boiler, build an operating load prediction model, and obtain a boiler operating load optimal value according to the operating load prediction model;
   a load calculation module, configured to obtain a boiler operating load measured value by the sensors, draw an operating load difference value curve according to the boiler operating load measured value, and determine a boiler coal consumption change amount according to the operating load difference value curve;
   a speed control module, configured to determine a coal conveying amount of a coal conveying system according to the boiler coal consumption change amount, and control operating speed of a coal conveying belt in the coal conveying system according to the coal conveying amount;
   a quality calculation module, configured to calculate boiler operating efficiency according to the operating speed, and determine a coal quality parameter according to the boiler operating efficiency;
   a fineness control module, configured to determine a coal particle parameter according to the coal quality parameter, set target coal particle fineness according to the coal particle parameter, and control a screening and crushing device in the coal conveying system according to the target coal particle fineness;
   wherein the model prediction module is further configured to:
   obtain historical boiler working parameters and corresponding historical operating load data by the sensors, and preprocess the historical boiler working parameters and corresponding historical operating load data;
   build a data set according to preprocessed historical boiler working parameters and corresponding historical operating load data, and build the operating load prediction model according to the data set;
   train the operating load prediction model according to the data set, and obtain a final operating load prediction model;
   input the current boiler working parameters into the final operating load prediction model, and obtain the boiler operating load optimal value;
   wherein the load calculation module is further configured to:
   calculate a difference value between the boiler operating load measured value and the optimal value, and draw the operating load difference value curve according to a change trend of the difference value between the boiler operating load measured value and the optimal value with time;

determine an average value of the operating load difference value in a preset time period according to the operating load difference value curve, and in response to determining that the average value of the operating load difference value in the preset time period is less than a first preset threshold value, set the boiler coal consumption change amount to zero;

in response to determining that the average value of the operating load difference value in the preset time period is greater than or equal to the first preset threshold value, set a boiler coal consumption change amount standard value, calculate a ratio of the average value of the operating load difference value in the preset time period to a preset standard average value, and obtain a boiler coal consumption change amount correction value;

multiply the boiler coal consumption change amount correction value with the boiler coal consumption change amount standard value, and obtain the boiler coal consumption change amount in the preset time period;

wherein the quality calculation module is further configured to:

determine an actual coal conveying amount in the preset time period according to conveying speed of the coal conveying belt in the preset time period, and calculate a boiler operating efficiency optimal value corresponding to the actual coal conveying amount according to boiler coal type information;

obtain a boiler operating efficiency measured value in the preset time period, calculate a difference value between the boiler operating efficiency optimal value and the measured value, and obtain an operating efficiency difference value;

calculate a ratio between the operating efficiency difference value and a preset standard operating efficiency difference value, and normalize the ratio between the operating efficiency difference value and the preset standard operating efficiency difference value, and obtain the coal quality parameter;

wherein the fineness control module is further configured to:

substitute the coal quality parameter into a coal particle parameter calculation formula, and obtain the coal particle parameter, wherein the coal particle parameter calculation formula specifically is:

$$R_s = R_\alpha \exp(Q_s)$$

wherein $R_s$ is the coal particle parameter, $R_\alpha$ is a preset standard coal particle parameter, exp is a natural exponential function, and $Q_s$ is a coal quality parameter;

wherein the fineness control module is further configured to:

determine a coal particle fineness correction value according to a difference value between the coal particle parameter and the preset standard coal particle parameter, and in response to determining that the difference value between the coal particle parameter and the preset standard coal particle parameter is greater than a second preset threshold, set a first correction value as the coal particle fineness correction value;

in response to determining that the difference value between the coal particle parameter and the preset standard coal particle parameter is less than or equal to the second preset threshold, set a second correction value as the coal particle fineness correction value;

in response to determining that the difference value between the coal particle parameter and the preset standard coal particle parameter is less than a third preset threshold, set a third correction value as the coal particle fineness correction value;

wherein the speed control module is further configured to:

determine a boiler coal consumption amount in the preset time period according to the boiler coal consumption change amount, and determine a target coal conveying amount of the coal conveying belt in the preset time period according to the boiler coal consumption amount in the preset time period;

divide the preset time period into a plurality of sub-periods, and set a maximum allowable cross-sectional area of the coal conveying belt in each of the sub-periods according to the target coal conveying amount in the preset time period;

obtain a current cross-sectional area of the coal conveying belt, calculate a ratio of the current cross-sectional area to the maximum allowable cross-sectional area, and obtain full load rate of the coal conveying belt;

control the conveying speed of the coal conveying belt according to the full load rate of the coal conveying belt.

2. The coal conveying control system for a thermal power plant according to claim 1, wherein the speed control module is further configured to:

detect the full load rate of the coal conveying belt in real time, and draw a full load rate change curve according to a change trend of the full load rate of the coal conveying belt with time;

when current full load rate being less than a first preset threshold is detected, calculate an absolute value of a slope average value of the current full load rate in a each of the sub-periods according to the full load rate change curve, and obtain a full load rate change speed parameter;

calculate a ratio of a preset standard full load rate change speed parameter to the full load rate change speed parameter, and obtain a conveying speed correction parameter;

multiply the conveying speed correction parameter with current coal conveying belt conveying speed, obtain corrected coal conveying belt conveying speed, and update the corrected coal conveying belt conveying speed to the current coal conveying belt conveying speed.

3. The coal conveying control system for a thermal power plant according to claim 1, wherein the fineness control module is further configured to:

obtain coal particle fineness of a current screening and crushing device, multiply the coal particle fineness of the current screening and crushing device with the coal particle fineness correction value, and obtain the target coal particle fineness;

input the target coal particle fineness into the screening and crushing device, and perform screening and crushing on coal by the screening and crushing device.

4. A coal conveying control method for a thermal power plant, performed by a computer device, and comprising:

obtaining current boiler working parameters by sensors arranged in a boiler, building an operating load prediction model, and obtaining a boiler operating load optimal value according to the operating load prediction model;

obtaining a boiler operating load measured value by the sensors, drawing an operating load difference value curve according to the boiler operating load measured value, and determining a boiler coal consumption change amount according to the operating load difference value curve;

determining a coal conveying amount of a coal conveying system according to the boiler coal consumption change amount, and controlling operating speed of a coal conveying belt in the coal conveying system according to the coal conveying amount;

calculating boiler operating efficiency according to the operating speed, and determining a coal quality parameter according to the boiler operating efficiency;

determining a coal particle parameter according to the coal quality parameter, setting target coal particle fineness according to the coal particle parameter, and controlling a screening and crushing device in the coal conveying system according to the target coal particle fineness;

wherein obtaining a boiler operating load optimal value according to the operating load prediction model comprises:

obtaining historical boiler working parameters and corresponding historical operating load data by the sensors, and preprocessing the historical boiler working parameters and corresponding historical operating load data;

building a data set according to preprocessed historical boiler working parameters and corresponding historical operating load data, and building the operating load prediction model according to the data set;

training the operating load prediction model according to the data set, obtaining a final operating load prediction model;

inputting the current boiler working parameters into the final operating load prediction model, obtaining the boiler operating load optimal value;

wherein obtaining a boiler operating load measured value, drawing an operating load difference value curve according to the boiler operating load measured value, and determining a boiler coal consumption change amount according to the operating load difference value curve comprise:

calculating a difference value between the boiler operating load measured value and the optimal value, and drawing the operating load difference value curve according to a change trend of the difference value between the boiler operating load measured value and the optimal value with time;

determining an average value of the operating load difference value in a preset time period according to the operating load difference value curve, and in response to determining that the average value of the operating load difference value in the preset time period is less than a first preset threshold value, setting the boiler coal consumption change amount to zero;

in response to determining that the average value of the operating load difference value in the preset time period is greater than or equal to the first preset threshold value, setting a boiler coal consumption change amount standard value, calculating a ratio of the average value of the operating load difference value in the preset time period to a preset standard average value, obtaining a boiler coal consumption change amount correction value;

multiplying the boiler coal consumption change amount correction value with the boiler coal consumption change amount standard value, obtaining the boiler coal consumption change amount in the preset time period;

wherein calculating boiler operating efficiency according to the operating speed, and determining a coal quality parameter according to the boiler operating efficiency comprise:

determining an actual coal conveying amount in the preset time period according to conveying speed of the coal conveying belt in the preset time period, and calculating a boiler operating efficiency optimal value corresponding to the actual coal conveying amount according to boiler coal type information;

obtaining a boiler operating efficiency measured value in the preset time period, calculating a difference value between the boiler operating efficiency optimal value and the measured value, and obtaining an operating efficiency difference value;

calculating a ratio between the operating efficiency difference value and a preset standard operating efficiency difference value, and normalizing the ratio between the operating efficiency difference value and the preset standard operating efficiency difference value, obtaining the coal quality parameter;

wherein determining a coal particle parameter according to the coal quality parameter comprises:

substituting the coal quality parameter into a coal particle parameter calculation formula, obtaining the coal particle parameter, wherein the coal particle parameter calculation formula specifically is:

$$R_s = R_\alpha \exp(Q_s)$$

wherein $R_s$ is the coal particle parameter, $R_\alpha$ is a preset standard coal particle parameter, exp is a natural exponential function, and $Q_s$ is a coal quality parameter;

wherein setting target coal particle fineness according to the coal particle parameter comprises:

determining a coal particle fineness correction value according to a difference value between the coal particle parameter and the preset standard coal particle parameter, and in response to determining that the difference value between the coal particle parameter and the preset standard coal particle parameter is greater than a second preset threshold, setting a first correction value as the coal particle fineness correction value;

in response to determining that the difference value between the coal particle parameter and the preset standard coal particle parameter is less than or equal to the second preset threshold, setting a second correction value as the coal particle fineness correction value;

in response to determining that the difference value between the coal particle parameter and the preset standard coal particle parameter is less than a third preset threshold, setting a third correction value as the coal particle fineness correction value;

wherein determining a coal conveying amount of a coal conveying system according to the boiler coal consumption change amount, and controlling operating speed of a coal conveying belt in the coal conveying system according to the coal conveying amount, comprises:

determining a boiler coal consumption amount in the preset time period according to the boiler coal consumption change amount, and determining a target coal conveying amount of the coal conveying belt in the preset time period according to the boiler coal consumption amount in the preset time period;

dividing the preset time period into a plurality of sub-periods, and setting a maximum allowable cross-sectional area of the coal conveying belt in each of the sub-periods according to the target coal conveying amount in the preset time period;

obtaining a current cross-sectional area of the coal conveying belt, calculating a ratio of the current cross-sectional area to the maximum allowable cross-sectional area, and obtaining full load rate of the coal conveying belt;

controlling the conveying speed of the coal conveying belt according to the full load rate of the coal conveying belt.

5. The coal conveying control method according to claim 4, wherein determining a coal conveying amount of a coal conveying system according to the boiler coal consumption change amount, and controlling operating speed of a coal conveying belt in the coal conveying system according to the coal conveying amount, further comprises:

detecting the full load rate of the coal conveying belt in real time, and drawing a full load rate change curve according to a change trend of the full load rate of the coal conveying belt with time;

when current full load rate being less than a first preset threshold is detected, calculating an absolute value of a slope average value of the current full load rate in a each of the sub-periods according to the full load rate change curve, and obtaining a full load rate change speed parameter;

calculating a ratio of a preset standard full load rate change speed parameter to the full load rate change speed parameter, and obtaining a conveying speed correction parameter;

multiplying the conveying speed correction parameter with current coal conveying belt conveying speed, obtaining corrected coal conveying belt conveying speed, and updating the corrected coal conveying belt conveying speed to the current coal conveying belt conveying speed.

6. The coal conveying control method according to claim 4, wherein determining a coal particle parameter according to the coal quality parameter, setting target coal particle fineness according to the coal particle parameter, and controlling a screening and crushing device in the coal conveying system according to the target coal particle fineness, further comprises:

obtaining coal particle fineness of a current screening and crushing device, and multiplying the coal particle fineness of the current screening and crushing device with the coal particle fineness correction value, and obtaining the target coal particle fineness;

inputting the target coal particle fineness into the screening and crushing device, and performing screening and crushing on coal by the screening and crushing device.

* * * * *